United States Patent [19]
Dawson

[11] Patent Number: 5,868,327
[45] Date of Patent: Feb. 9, 1999

[54] MIXING AND DISPENSING APPARATUS AND METHOD

[76] Inventor: John Allan Dawson, R.R. 4, Site 450, C-7, Courtenay, British Columbia, Canada, V9N 7J3

[21] Appl. No.: 806,545

[22] Filed: Feb. 24, 1997

[51] Int. Cl.⁶ .................................................. B02C 19/00
[52] U.S. Cl. .................... 241/44; 241/101.8; 366/155.1; 366/160.2
[58] Field of Search ................................. 47/58, DIG. 9; 366/160.2, 155.1, 155.2, 14; 241/605, 101.8, 44

[56] References Cited

U.S. PATENT DOCUMENTS

| | | | |
|---|---|---|---|
| 2,557,358 | 6/1951 | Martinson | 366/14 |
| 2,915,299 | 12/1959 | Woebcke . | |
| 2,917,465 | 12/1959 | Begley | 366/155.1 |
| 3,284,009 | 11/1966 | Stull et al. . | |
| 3,463,398 | 8/1969 | Smith et al. . | |
| 3,920,184 | 11/1975 | Waldrum . | |
| 3,968,933 | 7/1976 | Waldrum . | |
| 4,099,689 | 7/1978 | Sterner et al. . | |
| 4,172,499 | 10/1979 | Richardson et al. . | |
| 4,453,675 | 6/1984 | Kodadek et al. . | |
| 4,601,345 | 7/1986 | Mahrt . | |
| 5,028,010 | 7/1991 | Sansing | 241/101.8 |
| 5,192,130 | 3/1993 | Endo et al. | 366/155.1 |
| 5,322,219 | 6/1994 | Esplin | 239/171 |
| 5,451,376 | 9/1995 | Proksa et al. | 241/101.8 |
| 5,507,574 | 4/1996 | Dickey | 366/14 |

*Primary Examiner*—Mark Rosenbaum

[57] ABSTRACT

The apparatus produces batches of mixture in first and second mixing chambers containing liquid, each chamber having a liquid port and a mixer. A valve, communicating with the liquid ports, controls liquid flow relative to each chamber, and a main pump and conduit communicates with the valve to displace liquid. A staging tank communicates with the conduit to receive liquid therefrom and has a main discharge port for discharging into a dispersal container. The staging tank is elevated to permit a rapid gravity feed into the dispersal container, so as to reduce waiting time. A shredder to shred material within a hopper prior to discharge into the mixing chamber can be provided. The method of the invention permits the discharging of a first batch of mixture from the first chamber to the staging tank from where it can be dispensed, while preparing a second batch in the second chamber, which is then discharged to the staging tank. Preparing and discharging batches in sequence provides an essentially continuous supply of mixture so as to reduce helicopter waiting time.

13 Claims, 4 Drawing Sheets

MIXING AND DISPENSING APPARATUS AND METHOD

BACKGROUND OF THE INVENTION

The invention relates to a mixing and dispensing apparatus and method, particularly for preparing a hydro-seeding mixture or slurry for dispensing to a helicopter-carried slurry dispersal apparatus.

Hydro-seeding refers to a process wherein a settable slurry containing seeds is dispersed on selected sites that would otherwise be subject to erosion, e.g. steep loose slopes, so that when the slurry is set, heavy precipitation is unlikely to remove the slurry, enabling the seeds to take root in the steep slopes. It is well known that steep slopes are subject to erosion from precipitation such as rain and snow, specially when such slopes have been clear—cut of trees, or have roads traversing them, particularly in rugged unstable mountainous terrain. It is known to spray hydro-seeding material onto such areas, but usually the material is sprayed from dispersal apparatus carried on a truck which gains access to the site usually by road. In areas where the roads have been washed out, or the area is otherwise impassable to trucks, it is known to prepare the slurry at a truck base closest to the selected site, and to dispense the slurry to dispersal apparatus carried by a helicopter, which then transports the material to the site, sprays the site from the air, and then returns to the truck base for a further load of hydro-seeding slurry. Helicopters are very costly to operate, and if the helicopter has to travel a long way from the truck base to the site to be treated with hydro-seeding, or the helicopter must wait excessively for the mixture to be prepared and/or dispensed, operating costs become prohibitive.

Hydro-seeding slurry is usually prepared from ingredients closely adjacent the site where it is to be sprayed so as to reduce transportation of water, which is usually the heaviest ingredient of the mixture. Water is normally obtained from a convenient nearby source, such as a creek or lake, and the hydro-seeding slurry is prepared on site in a mixing apparatus prior to dispensing the mixture to a dispersal container carried by the helicopter. The dispersal container is fitted with a dispersal apparatus, usually a rotary slinger which rotates about a generally vertical axis and slings the hydro-seeding slurry onto the site to be treated. The hydro-seeding slurry has four main constituents, namely water, fertilizer, a gum or bonding agent such as guam gum, and seeds which are usually mixed with a fibrous material such as chopped wood waste, peat moss etc. The seeds and fibrous material are usually packaged in compressed bales to facilitate storage and transportation, but because the bales are relatively tightly compressed they do not readily mix with water unless they are first broken into smaller pieces, for example by shredding. While shredding can be performed manually, it is a slow process and can delay preparation of the final mixture, which can result in wasted time for the helicopter. It is important that the persons shredding the bale can break up the bale sufficiently quickly to enable batches of mixture of consistent quality to be produced on an essentially continuous basis, so as to essentially eliminate waiting time for helicopters.

SUMMARY OF THE INVENTION

The invention reduces the difficulties and disadvantages of the prior art by providing a mixing and dispensing apparatus particularly for hydro-seeding which is sufficiently light and compact to permit transportation by helicopter into rugged terrain inaccessible by truck. In addition, the mixing and dispensing apparatus can process ingredients for producing hydro-seeding mixture or slurry quickly and of consistent quality so that if helicopters are used to disperse the hydro-seeding mixture, waiting time for the helicopters due to mixing of the material is essentially eliminated. Clearly, separate portions of the apparatus must be designed to be within the lifting capacity of the helicopters used for such work, and must be self-contained so as to operate in the wilderness without access to other power supplies, apart from that can be transported by helicopter. Thus the apparatus must be able to be powered by gasoline or diesel fuel, and apart from a supply of reasonably clean water and the slurry ingredients, the apparatus must be independent of other external supplies.

The mixing and dispensing apparatus comprises first and second mixing chambers, a valve means, a main pump and a staging tank. The mixing chambers are adapted to receive liquid, each chamber having at least one liquid port and a mixer. The valve means communicates with the liquid ports to control liquid flow relative to the port of each chamber. The main pump and a conduit means communicate with the valve means to displace liquid relative to the chambers. The staging tank communicates with the conduit means to receive batches of mixture from the mixing chambers, the staging tank having a main discharge port to dispense mixture therethrough.

Preferably, the invention further includes a shredder to shred material held in a holder and to discharge shredded material selectively as required into each mixing chamber. Preferably each holder is a hopper having an upper opening to receive a bale of material therein, and a lower opening positioned to discharge shredded material under gravity into the respective working chamber. A shredder shaft passes through the first and second hoppers of the first and second shredding apparatus and is located between the upper and lower openings thereof. The shredder shaft carries first and second rotary cutters, each of which is positioned within the respective hopper to engage a bale held therein, the shredder shaft being powered for rotation. Preferably, the staging tank is elevated with respect to the mixing chambers so that the main discharge port thereof is elevated sufficiently to permit a dispersal container of required size to be located below the discharge port so as to be filled therefrom by gravity.

The method according to the invention is for mixing a material with a liquid and dispensing the resulting mixture and comprises the steps of:
  discharging the liquid and the material into a first mixing chamber, and agitating the liquid and material to produce a first batch of mixture thereof,
  discharging at least a portion of the first batch of mixture from the first chamber to a staging tank,
  discharging more liquid and more material into a second mixing chamber, and agitating said more liquid and more material to produce a second batch of mixture thereof,
  discharging the mixture in the staging tank into a dispersal container,
  discharging at least a portion of the second batch of mixture from the second chamber to the staging tank, and
  discharging the mixture in the staging tank into the dispersal container.
Preferably, the method is further characterized by:
  discharging the batches of mixture sequentially from the first and second mixing containers upwardly to the staging tank which is located above the mixing containers, and discharging each batch of mixture from the staging tank under gravity into the dispersal container.

A detailed disclosure following, related to drawings, describes a preferred apparatus and method according to the invention, which is capable of expression in apparatus and method other than those particularly described and illustrated.

DETAILED DESCRIPTION

Figure 1:
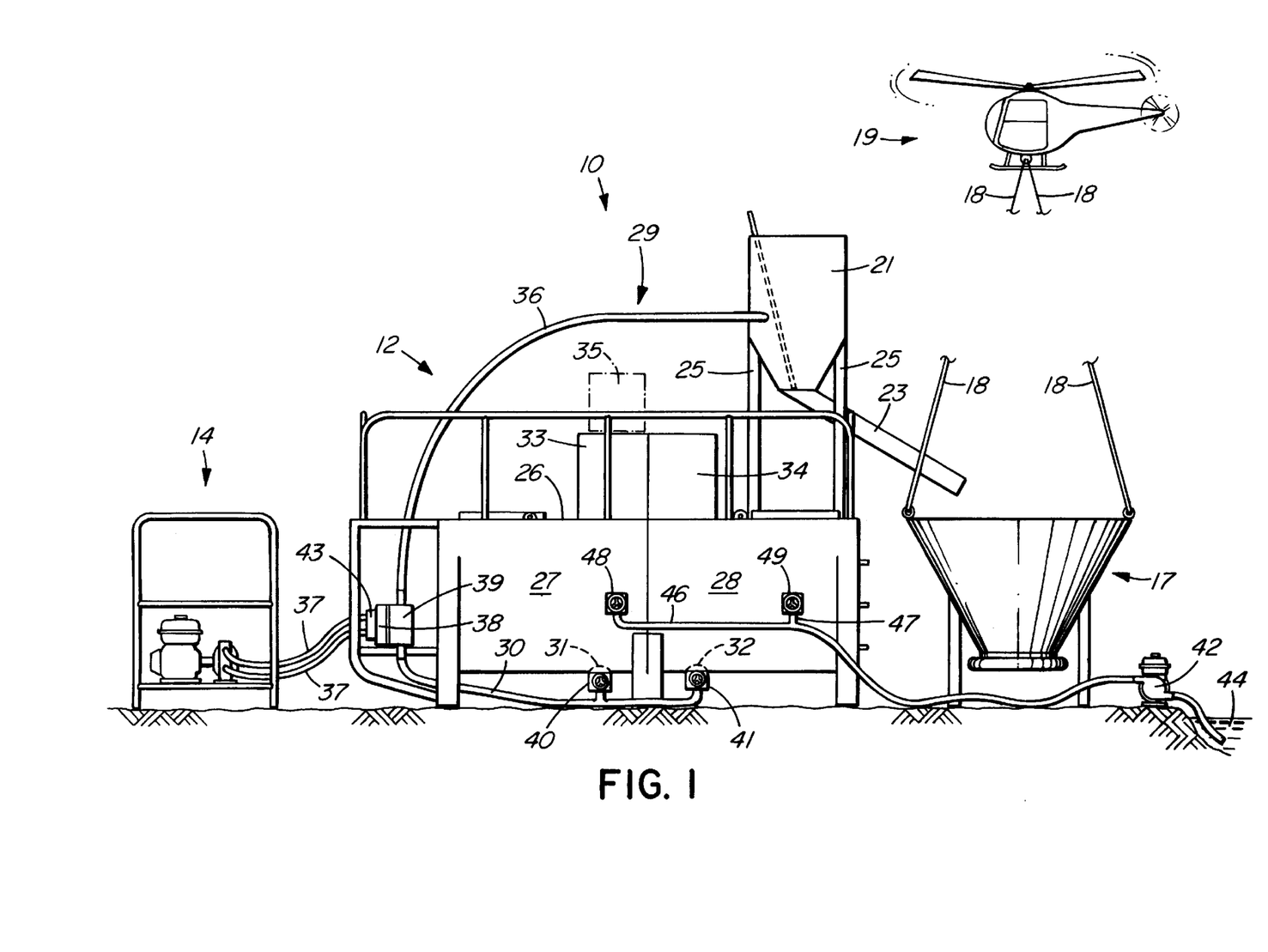
FIG. 1 is a simplified, diagrammatic side elevation of an apparatus according to the invention shown supplying the hydro-seeding slurry to a dispersal container carried by a helicopter, hydraulic control valves and associated structure and other details being omitted for clarity.

FIG. 1

A hydro-seeding apparatus 10 according to the invention comprises a mixing and dispensing apparatus 12 and a power-pack apparatus 14 which cooperate to produce hydro-seeding mixture or slurry on an essentially continuous basis as will be described. The mixture is dispensed by the apparatus 12 into a dispersal container 17 which is a prior art hopper and dispersal apparatus which slings slurry onto the site to be protected. A helicopter 19 carries the container 17 with a cable bridle 18 and is shown hovering while the container is being filled from a staging tank 21 of the apparatus 12. In order to reduce operating costs, preferably the helicopter hovers for only sufficient time to fill the dispersal container 17 with slurry which has previously been prepared and is held in the staging tank 21 until required.

The tank 21 is elevated so as to be above the dispersal container 17 and has a relatively large diameter discharge hose 23 from which slurry is discharged under gravity from the staging tank into the container 17. The slurry is discharged within a very short space of time, thus eliminating need for a high capacity discharge pump which would otherwise be required to reduce hover time for the helicopter, and associated operating costs. The staging tank has four legs 25 (only two being shown) which rest upon an elevated operator platform 26 of the apparatus 12 and thus the platform serves as a staging tank support. Preferably, the staging tank is releasably attached to the support to prevent toppling should the apparatus be subjected to high winds, or be placed on uneven ground, or soft ground causing settling etc. The staging tank is thus releasably supported on the staging tank support to facilitate separation of the staging tank from the apparatus 12 to enable separate transportation and storage thereof with the power-pack apparatus 14 as will be described. Clearly, the legs 25 support the staging tank in a position above the staging tank support to elevate the staging tank sufficiently to permit discharge of liquid through the discharge hose 23 into the dispersal container located below the discharge port.

The mixing and dispensing apparatus 12 further comprises first and second mixing chambers 27 and 28 which are supported below the operator platform 26 and have liquid ports 31 and 32 (broken outline) in lowermost portions of the chambers 27 and 28 respectively. The apparatus further includes first and second hoppers 33 and 34 which receive bales of seeding material 35 (broken outline) and are positioned above the respective mixing chambers so as to discharge material into the chambers as will be described. The power-pack apparatus 14, which will be described in greater detail with reference to FIGS. 9 and 10, generates a flow of pressurized hydraulic fluid and is shown with a pair of hydraulic hoses 37 communicating with a hydraulic control unit 43 to supply and return hydraulic fluid between the power-pack apparatus 14 and the apparatus 12. The unit 43 comprises a reversible, variable speed hydraulic valve bank with three valves having ports communicating with the hydraulic hoses 37, and ports communicating with three hydraulic motors as will be described. Each valve is reversible to enable a reversing of flow through the unit, and furthermore is a modulating valve to vary volume flow individually to each motor to vary speed thereof as required.

One valve of the bank communicates with hydraulic motor 38 which powers a main pump 39 located on the apparatus 12. The pump 39 is reversible and displaces fluid as required within a conduit means 29 extending between the mixing chambers 27 and 28 and the staging tank 21 as will be described. First and second outlet valves 40 and 41 communicate with the respective first and second liquid ports 31 and 32 and with an intermediate conduit 30 extending to an inlet of the pump 39 and forming a portion of the conduit means 29. A main conduit 36 extends between an outlet of the pump 39 and the staging tank 21 to form a remaining portion of the conduit means 29. The valves 41 and 42 control discharge of liquid from the respective mixing chamber, and if the pump 39 is reversed, also return liquid to the appropriate chamber as will be described. A self-contained portable water pump 42, powered by a small gasoline motor, is located by a local convenient water source 44, and has water hoses 46 and 47 extending from the pump 42 through manually controlled inlet valves 48 and 49 respectively which control respective inlet ports of the first and second mixing chambers 27 and 28 to supply water thereto.

Because all the equipment herein must be transportable by helicopter, it is important that excessive pumping capacity, or power or other characteristic that would contribute to additional unnecessary weight is essentially eliminated. Thus, pump sizes are selected to be adequate but not excessive so as to reduce power demand, which in turn reduces weight of any prime mover. Thus the self-contained portable water pump 42 is a relatively low capacity pump for pumping water which is usually available within a height of about 100 feet (30 meters) from the apparatus, and thus typically the pump 42 would have a capacity of about 200

U.S. gallons (about 700 liters) per minute at a maximum head of about 100 feet (about 30 meters). In contrast, the main pump 39 located on the apparatus is required to pump liquid from the mixing chambers up about 10 feet (about 3 meters) to the staging tank (or to reverse this flow), and thus this pump is a low head pump. On the other hand, the pump 39 handles the slurry mixture which is dense, and relatively abrasive and prone to interfere with normal light duty pump operation. Consequently, the main pump 39 is preferably a heavy duty, positive displacement reversible gear pump, with a delivery capacity also of about 200 U.S. gallons per minute.

Figure 2:
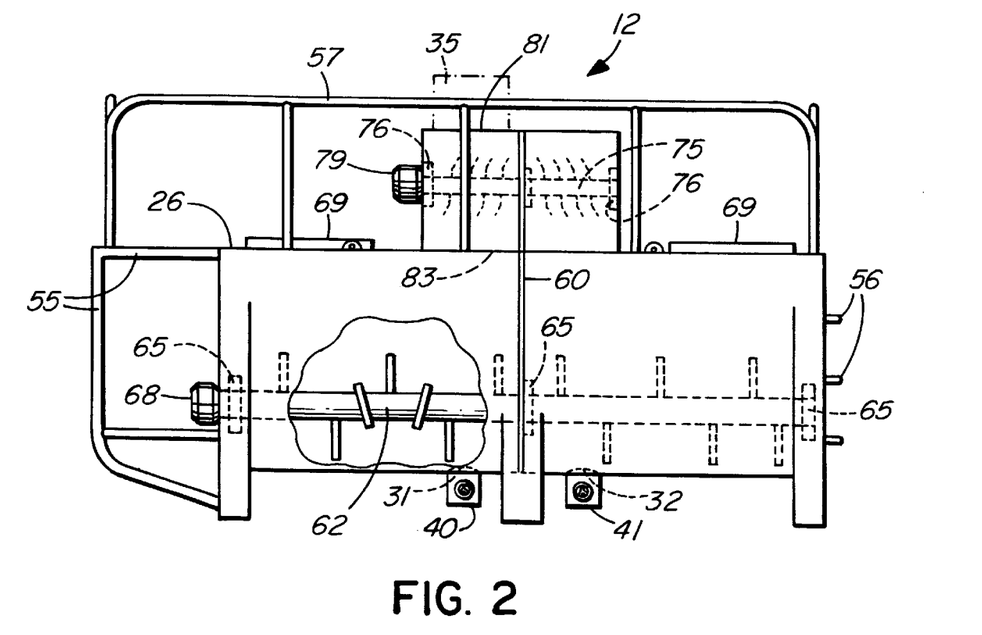
FIG. 2 is a simplified, partially fragmented, side elevation of a mixing and dispensing apparatus according to the invention.
Figure 3:
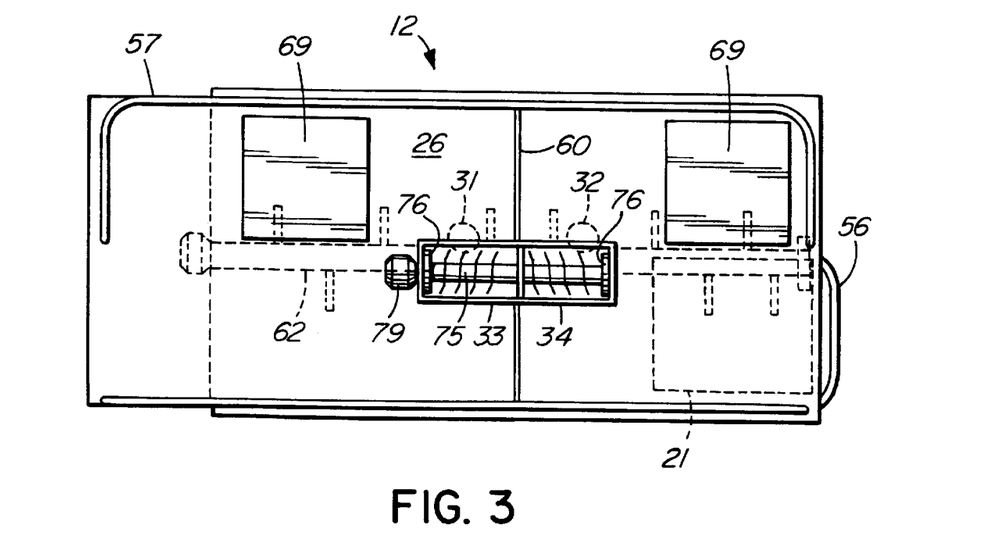
FIG. 3 is a simplified top plan of the apparatus of FIG. 2, location of a staging tank being shown in broken outline.
Figure 4:
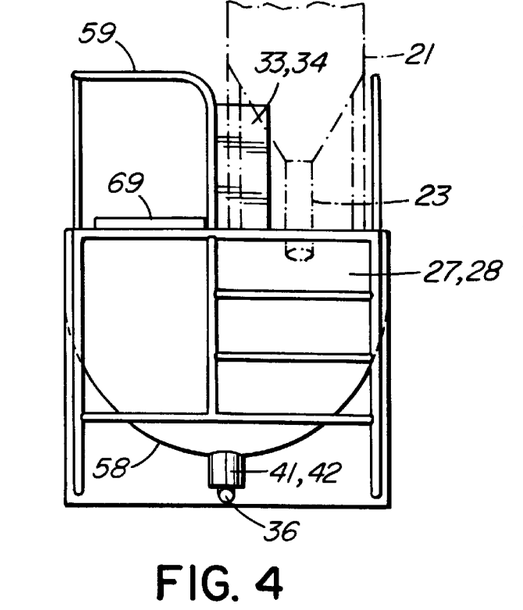
FIG. 4 is a simplified end elevation of the apparatus of FIG. 2, the location of the staging tank being shown also in broken outline.

FIGS. 2–4

The apparatus 12 includes a light weight tubular frame 55 which provides a stiff space frame and structure for supporting the platform 26, and the first and second mixing chambers 27 and 28. As seen in FIG. 4 the mixing chambers 27 and 28 have semi-cylindrical lower walls 58 which are shown in broken outline. The chambers are separated by a central transverse bulkhead 60 which provides a common inner wall thereof, and are generally symmetrical about the bulkhead.

The light weight frame 55 is specifically designed for being slung beneath a helicopter and thus is fabricated to be sufficiently light to enable lifting by a medium-sized helicopters as used in hydro-seeding, and yet is sufficiently strong to withstand loads imposed thereon during flight, and in operation in rugged terrain. The frame 55 provides railings 57 to help to protect the operator from falling accidents, as well as stairs 56 to facilitate access to upper structure, while also facilitating access to hoses and valves etc. associated with the frame 55 and located beneath the platform.

The apparatus 12 includes an agitator 62 which extends longitudinally through lower portions of the first and second mixing chambers to serve as a mixer for each chamber. The agitator is described in more detail with reference to FIG. 6 and is journalled for rotation in journals 65, broken outline, which are located in outer end walls of the chambers, and in the transverse bulkhead 60. A hydraulic motor 68 is mounted at an end of the agitator 62 to rotate the agitator, and similarly to the motor 38 is reversible and has a speed which can be varied considerably, depending on the consistency of the mixture within the mixing chambers. Some mixtures can be highly mobile, with a consistency similar to thin paint and thus are easy to mix, whereas other mixtures can be very stiff similarly to peanut butter and thus are prone to cavitation if the agitator rotates at an excessive speed. The operator adjusts the speed of the agitator to suit the consistency of the mixture, and if necessary can reverse the agitator to free any solid material that might jam between the agitator and the wall of the chamber. In this regard it is noted that lowermost portions of the rotors are located to be close to a lowermost portion of the lower wall 58 to reduce chances of stagnant mixture settling out or accumulating in lower portions of the chambers. The operator can quickly determine, by trial and error, optimum speed for rotation of the agitator to ensure that essentially all portions of the mixture are agitated on an essentially continuous basis to prevent settling or setting up of heavier materials in the mixture. Access openings fitted with hinged safety bars (not shown) and hinged covers 69 are provided in the platform 26 and positioned over the mixing chambers to permit the operator to view activity within the chamber, and facilitate access for servicing etc.

The first and second hoppers 33 and 34 are located above the first and second mixing chambers 27 and 28 respectively and are separated by the transverse bulkhead 60 which also provides a common inner wall thereof. A shredder 75 passes longitudinally through the hoppers, is described in more detail in FIGS. 7 and 8, and is journalled for rotation in journals 76 located in outer end walls of the hopper and in the central transverse bulkhead 60. A hydraulic motor 79 cooperates with an end of the shredder 75 to power the shredder for rotation in a manner similar to the agitator 62. The hydraulic motor 79 is similarly reversible and of variable speed so that the operator can select optimum speed for shredding the bales into portions of required size. Clearly, in some instances it might be necessary to reverse the direction of rotation should a bale jam the shredder to prevent rotation thereof. The hydraulic motors 68 and 79 receive and return hydraulic fluid relative to the hydraulic control unit 43, FIG. 1, through hoses, not shown.

The first hopper 33 has an upper opening 81 to receive the bale 35 of material (broken outline) as will be described, and a lower opening 83 positioned to discharge shredded material under gravity into the first mixing chamber. The shredder 75 is located between the upper and lower openings 81 and 83 of the hopper and positioned with respect to the walls of the hopper so that the bale material must pass closely to the shredder to chop or shred the bale into relatively small pieces prior to discharging into the respective mixing chamber. The hoppers are dimensioned to receive complete bales and thus serve as holders for bales of the material to be shredded, and clearly other holders could be substituted for hoppers. In any event, to maintain reasonable production, mechanised shredding of the bale is preferable to manual shredding and ensures uniformity of material passing into the mixing chamber. Clearly, the second hopper functions similarly to the first hopper, and thus the shredder can shred material selectively as required prior to discharge into the respective chamber.

Figure 5:
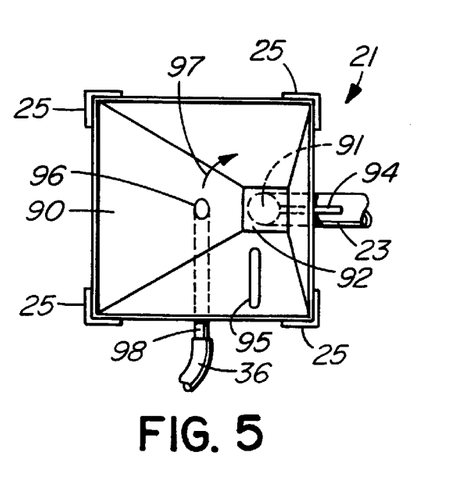
FIG. 5 is a simplified top plan of the staging tank of FIG. 1.

FIG. 5

The staging tank 21 has a liquid holding container 90 supported on the legs 25. The container has downwardly and inwardly tapering lower wall portions which terminate at a main discharge port 91 which is fitted with a main discharge valve 92 to control flow through the main discharge port. The valve 92 can be simple hinged gate valve which is held against a complementary seat of the port by weight of liquid within the staging tank. A link 94 is connected to a portion of the valve 92 remote from the hinge, to enable manual opening of the valve against weight of the water, so as to permit rapid discharge of liquid from the tank. A sight glass 95 permits an operator to monitor filling of the container so that it can be filled in a controlled manner to avoid over or under filling of the container 90. Preferably, the container 90 has a volume equal to volume of the dispersal container 17 (FIG. 1) carried by the helicopter, as this permits efficient complete discharge of the staging tank with minimal waiting time for the helicopter. In addition, preferably the staging tank has a volume which is a simple fraction of volume of a mixing chamber, typically about one-quarter of the volume so that a batch of mixture from a single mixing chamber can be used to fill the staging tank several times, in this case four times. It has been found that a ratio of 1:4 for the staging tank volume: mixing chamber volume is efficient, although clearly other ratios could be substituted.

The liquid holding container 90 has an inlet port 96 which is located relatively low on the side wall to be generally adjacent the discharge port 91. The port 96 is arranged to discharge liquid into the container 90 per an arrow 97 so as to be generally tangential with respect to the port 91 so as to induce a vortex in the liquid as the tank 21 fills. This is to ensure that liquid fed into the container is well agitated from the bottom as the container fills, so as to reduce a tendency of heavy materials to settle out from the slurry. The inlet port 96 communicates with a short length of inlet pipe 98 which is secured adjacent to an outer portion of the side wall of the container, and has an outer end connected to the main conduit 36.

Figure 6:
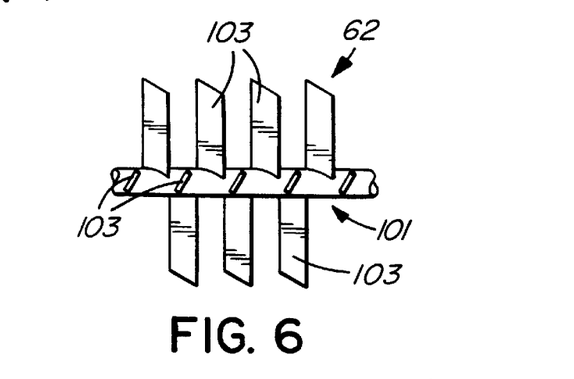
FIG. 6 is a simplified fragmented side elevation of a portion of an agitator as used in a mixing chamber.

FIG. 6

The agitator 62 comprises an agitator shaft 101 and a plurality of agitator rotors 103 which extend along the shaft between side walls of the mixing containers and the central transverse bulkhead 60, as shown in FIGS. 2–4. The agitator rotors comprise sheet metal blades with generally parallel edges which extend generally radially from the shaft 101. The blades are angularly spaced about the shaft at about 60–90 degree increments and are inclined at an angle to respective diametrical planes of the shaft, and resemble axially stacked propeller blades or a segmented helical screw. The number, shape and angulation of the agitator blades are critical, and serve to stir material within the mixing chamber to promote formation of a homogeneous mixture of fibrous material, seeds, gum and fertilizer, and to prevent settling of heavy materials from the mixture. Because of limitations relating to weight and power for agitating the mixture, the operator selects an optimum speed for rotating the agitator so as to cause a flow of material from one end of the chamber to the other due to the angulation of the blades along the shaft. In this way, stagnant portions of material are essentially eliminated, thus ensuring uniformity in the mixture. It is important to prevent cavitation which can easily occur within a thick mixture, and results in large portions of the mixture rotating without proper mixing, or merely being stagnant within the chamber.

Figure 7:
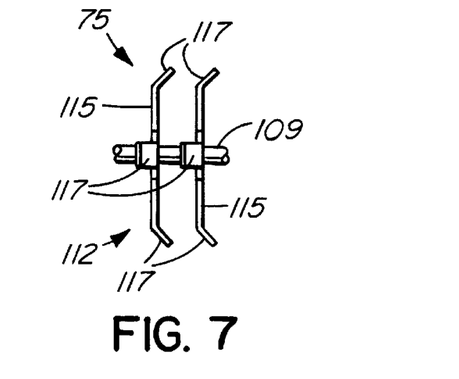
FIG. 7 is a simplified fragmented side elevation of a portion of a shredder of the invention.
Figure 8:
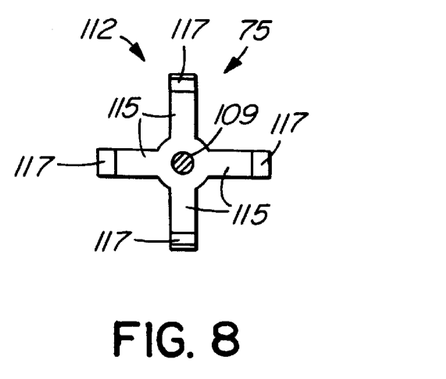
FIG. 8 is a simplified fragmented end elevation of the shredder of FIG. 7.

FIGS. 7 and 8

The shredder 75 has a shredder shaft 109 carrying a plurality of shredder rotors or rotary cutters 112 which are cut from sheet material and secured to the shaft 109 in axially spaced apart, generally parallel diametrical planes as best seen in FIG. 7. As best seen in FIG. 8, each rotor 112 has a plurality of arms 115, in this instance four arms, which extend from a central portion of the rotor and have tips 117 which are inclined at an angle to the plane of the rotor, preferably in opposite directions as seen in FIG. 7. All edges of the rotors are sharpened to facilitate cutting of the bale when rotating against the bale as it is held in the hopper.

Many other different types of shredders are envisaged, the purpose of the shredder being to cut or break up the bale quickly and efficiently into smaller portions to facilitate separation of the fibrous material to promote the formation of the homogeneous mixture within the mixing chambers. Clearly, if the fibrous or seeding material supplied to the hopper is not in bales, i.e. is in a loose form, then the shredders can be eliminated.

Figure 9:
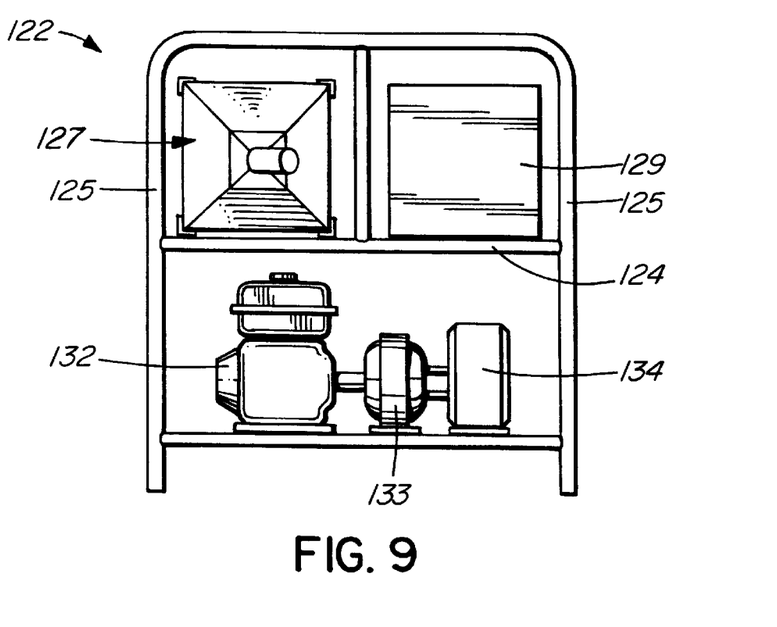
FIG. 9 is a simplified side elevation of a power-pack apparatus for use with the mixing and dispensing apparatus of FIGS. 2–8.
Figure 10:
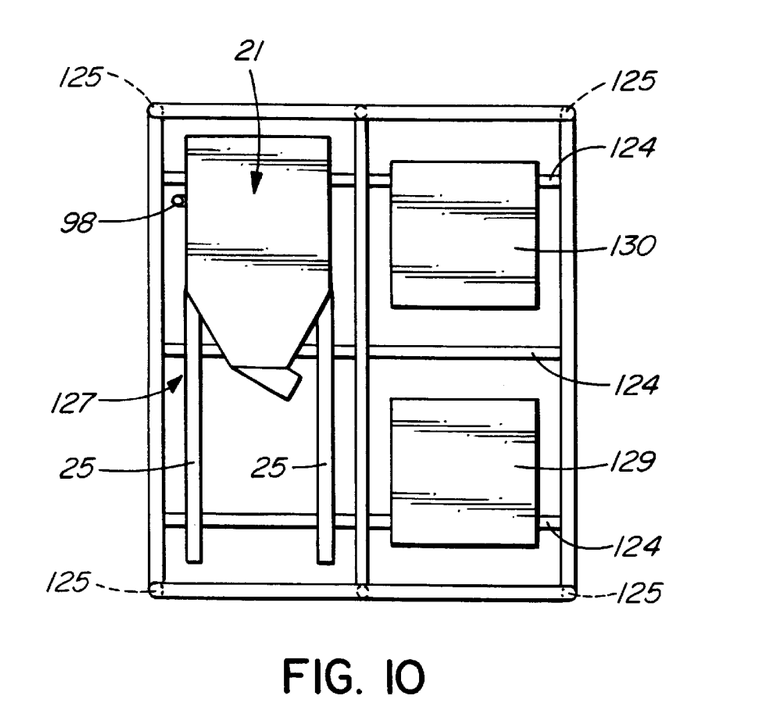
FIG. 10 is a simplified top plan of the power-pack apparatus of FIG. 9.

FIG. 9 and 10

The power-pack apparatus 14 has a light weight tubular frame 122 which is designed to withstand loads imposed upon it when slung beneath a helicopter and used in rugged terrain, while supporting relatively heavy accessories for use with the apparatus 12. The frame 122 has an upper storage portion separated from a lower storage portion by co-planar horizontal members 124 which extend between vertical members 125 located at corners of the frame. The members 124 provide three storage areas in the upper portion, the larger area being a main storage area 127 which is adapted to receive the staging tank 21 laid on its side with the legs 25 thereof adjacent one end of the frame, and an open end of the tank is adjacent an opposite end of the frame. The upper portion has two smaller areas which receive boxes 129 and 130 which are placed side by side and retained in place to prevent shifting during transportation. One of the boxes is for receiving the portable water pump 42 of FIG. 1, and fuel containers therefor, and the other box is for receiving the main conduit 36, the hydraulic hoses 37, the water hoses 46 and 47 and other miscellaneous parts. The power-pack apparatus 14 has a lower portion which contains an engine 132 which is directly connected to a hydraulic pump 133, and a hydraulic fluid sump 134 communicates with the pump 133 to supply and receive hydraulic fluid as required.

It can been seen that the power-pack apparatus 14 is smaller than the mixing apparatus 12, but has heavier items located therein and has a total loaded weight generally of the same order of magnitude as the apparatus 12. Clearly, optimally the apparatus 12 and the apparatus 14 will have generally similar weights when loaded, thus optimizing load carrying capacity of the helicopter.

In summary, it can be seem that the power-pack contains a supporting frame 122, a self-contained prime mover, i.e. the engine 132, which is supported by the frame and adapted to power the hydraulic pump 133, a receptacle supported by the frame i.e. the horizontal members 124, to receive the staging tank 21, and a container, i.e. boxes 129 and 130, supported by the frame to receive hoses, accessories and related equipment. It can be seen that the hydraulic pump 133 is supported by the frame and coupled to the prime mover to be powered thereby, and the sump 134 supplies hydraulic fluid to the pump to generate a supply of pressurized hydraulic fluid for supplying to equipment in the apparatus 12.

OPERATION

The mixing and dispensing apparatus 12 and the power-pack apparatus 14 are sized to fit on the bed of a truck for road transport to a truck base convenient for pick-up by helicopter. The helicopter slings each apparatus as an external load for taking from the truck to a base site which is convenient to the water source 44 and has reasonably level ground to provide stable support for each of the apparatus 12 and 14. As seen in FIG. 1, the water pump is connected with hoses 46 and 47 to supply fluid through the inlet valves 48 and 49 to the chambers. The staging tank 21 is removed from its storage position in the receptacle of the power-pack unit 14, i.e. lying on the members 124, and located and secured upright on its legs 25 so as to be elevated with respect to the platform 26. Hoses and conduits are removed from boxes in the power-pack and connected from the pump to the tank, and the main conduit means 29 is connected to extend between the valves 40 and 41, the pump 39, and the inlet pipe 98 (FIG. 5) of the staging tank to receive liquid from the outlet valves 40 and 41. With the exception of water, the helicopter also flies in all ingredients necessary for operation, namely fuel, fertilizer, gum or bonding agent, and bales of seeding/fibrous material.

The operator starts the water pump 42 to supply water from the source 44 into the first chamber 27, and starts the engine 132 so that hydraulic pump 133 supplies pressurized fluid to the hydraulic motors 79 and 68 to operate the shredders 75 in the hoppers, and the agitators 62 in the mixing chambers. Granular or powdered ingredients are dumped into the chamber 27 to start mixing. One (or more) bales 35, located within the first hopper 33, is chopped by the cutters of the rotors 112 to break up the bale into smaller pieces which fall into the first mixing chamber. The small pieces of the bale material facilitate break-up in the water under the influence of the agitators. When the inlet valve is closed, the first chamber 27 eventually becomes filled with a reasonably homogenized mixture of hydro-seeding slurry, at which time the main pump 39 is started, and the outlet valve 40 is opened to discharge a first batch of slurry from the first chamber to the staging tank using the main pump 39. As the staging tank 21 has a capacity of about one quarter of the volume of the mixing chamber 27, when the container of the staging tank reaches its limit, as seen by the sight-glass 95, the outlet valve 40 is closed, but the remaining slurry can be still agitated in the chamber. Usually a helicopter then arrives at the apparatus and places its dispersal container 17 beneath the hose 23, at which stage the operator opens the main discharge valve 92 with the link 94 to discharge the contents of the container 90 into the dispersal container 17 under gravity, usually in a few seconds. The helicopter can then take-off and disperse the hydro-seeding material onto the site for reclamation.

In the meantime, the operator can be filling the second chamber 28 with water through the inlet valve 49, and cutting one or more bales in the second hopper 34 so that eventually there will be a second batch of mixture of hydro-seeding slurry being agitated in the second chamber. During this time, the operator may deliver to the staging tank the remaining second, third, and fourth portions of slurry from the first batch in the mixing chamber 27 which can then be discharged in sequence into the dispersal container 17 of the helicopter. When the first chamber 27 is empty, the outlet valve 40 is closed, and the second batch in the mixing chamber 28 can be used to fill the staging tank 21 by opening the second outlet valve 41 similarly to the previously described procedure.

It is added that because each mixing chamber contains sufficient volume to fill the staging tank several times, in this instance four times, it is relatively easy to make an adjustment to the consistency of the slurry in each batch to suit particular terrain or weather conditions as dictated by the pilot of the helicopter. Thus, when a second batch is being mixed up in the second mixing chamber, adjustments to the mixture can be made at that time which will soon effect the application because it does not take long for the helicopter to disperse four loads from the dispersal container 17 and thus start on a second batch from the second mixing tank. This contrasts with prior art procedures in which relatively very large batches of slurry are usually mixed and changes to the mixture cannot be made quickly.

If there is an excessive delay in the helicopter returning to pick up another load of slurry, e.g. 10–15 minutes, the slurry in the staging tank can be pumped back into the appropriate mixing chamber by reversing the pump 39. This is to avoid chances of the slurry starting to come out of suspension and settle on the bottom of the staging tank, thus causing problems in opening the valve 92 and/or discharging through the main discharge port 91.

In summary, it can be seen that the method according to the invention comprises the following steps:

discharging the liquid and the material into a first mixing chamber, and agitating the liquid and material to produce a first batch of mixture thereof, discharging at least a portion of the first batch of mixture from the first chamber to a staging tank, discharging more liquid and more material into a second mixing chamber, and agitating said more liquid and more material to produce a second batch of mixture thereof, discharging the mixture in the staging tank into a dispersal container, discharging at least a portion of the second batch of mixture from the second chamber to the staging tank, and discharging the mixture in the staging tank into the dispersal container.

It can been seen that while the first mixture is being mixed in the first chamber, the process can include shredding a second bale of material prior to discharge into the second chamber. Also, while mixing the second bale of material with water in the second chamber, it can be efficient to discharge the first batch of mixture to the staging tank. It can been seen that the method is further characterized by discharging the batches of mixture sequentially from the first and second mixing chambers upwardly to the staging tank which is located above the mixing chambers, and discharging each batch of mixture from the staging tank under gravity into the dispersal container, thus permitting rapid discharge from the staging tank without use of a discharge pump.

ALTERNATIVES

The apparatus is shown with hoppers equipped with cutters for cutting bales of material of seeding and fibrous matter, which comprise some of the ingredients for preparing a hydro-seeding slurry. The present apparatus can be used to prepare and dispense mixtures for other applications from other starting ingredients, which may be in powder or granular form, concentrated liquid form, or in a form which does not require shredding of bales or other coarser material. Such applications may include mixtures of fire suppressant, herbicide, pesticide, etc., and the shredder can be omitted, although it may be necessary to substitute other tools for breaking up alternative ingredients. While water is the normal liquid used to produce the mixtures, other liquids can be substituted.

Also, the apparatus is shown having rotary cutters in the shredder, and a rotary agitator as a mixer for mixing the mixture. In some applications a reciprocating cutter and/or reciprocating agitator can be substituted as required. Clearly, while the present apparatus is shown having a pair of shredders and pair of mixing chambers in which each pair is disposed in parallel, in some applications it may be preferable to have three or more of each disposed in parallel, particularly if the mixture takes a while to prepare and thus mixing time is considerable and it is necessary to ensure that at least one batch of mixture is always available in the staging tank for dispensing to a helicopter-carried dispersal container. This would be particularly applicable if more than one helicopter was being used with a particular apparatus.

Hydraulically powered pumps and shafts are preferred, but alternative power means can be substituted.

What is claimed is:

1. A mixing and dispensing apparatus for mixing a shreddable starting material with a liquid, the apparatus comprising:

(a) a mechanical shredder to shred the starting material into a resultant shredded material, the shredder comprising first and second shredding apparatus located in parallel to each other to discharge the shredded material under gravity, (b) first and second mixing chambers located in parallel to each other and adapted to receive the shredded material selectively from the first and second shredding apparatus respectively, and the chambers also being adapted to receive the liquid, each chamber having at least one liquid port and a mixer to produce a resultant mixture of the liquid and shredded material, (c) a valve means communicating with the liquid ports to control flow of the mixture relative to the port of each chamber, (d) a main pump and a conduit means communicating with the valve means to selectively displace the mixture relative to the chambers, and (e) a staging tank communicating with the conduit means to receive batches of the mixture from the mixing chambers, the staging tank having a main discharge port to dispense the mixture therethrough.

2. An apparatus as claimed in claim 1, in which:

(a) each shredding apparatus comprises a holder to receive a bale of material to be shredded, and a cutter located adjacent the holder to cut the bale of material.

3. An apparatus as claimed in claim 2, in which:

(a) each holder is a hopper located above the respective mixing chamber, each hopper having an upper opening to receive the bale therein, and a lower opening positioned to discharge shredded material into the respective mixing chamber, and (b) the cutter comprises a shredder shaft and first and second rotary cutters mounted thereon, the shredder shaft passing through the first and second hoppers of the first and second shredding apparatus and being located between the upper and lower openings thereof, the first and second rotary cutters being positioned within the respective hopper to engage a bale held therein, the shredder shaft being powered for rotation.

4. An apparatus as claimed in claim 1, in which:

(a) the liquid ports of the first and second mixing chambers comprise first and second outlet ports respectively, and (b) the valve means comprises first and second outlet valves communicating with the first and second outlet ports respectively to supply batches of mixture sequentially to the staging tank.

5. An apparatus as claimed in claim 4, in which:

(a) the main pump has a pump inlet, and (b) the conduit means comprises an intermediate conduit which communicates with the first and second outlet valves and the pump inlet to supply the mixture to the main pump.

6. An apparatus as claimed in claim 4, in which:

(a) the main pump has a pump outlet, and (b) the conduit means comprises a main conduit which communicates with the pump outlet and extends to the staging tank.

7. A mixing and dispensing apparatus for mixing a shreddable starting material with a liquid, the apparatus comprising:

(a) a mechanical shredder to shred the starting material into a resultant shredded material, (b) first and second mixing chambers adapted to receive the shredded material and the liquid, each chamber having at least one liquid port and a mixer to produce a resultant mixture of the liquid and shredded material, (c) a valve means communicating with the liquid ports to control flow of the mixture relative to the port of each chamber, (d) a main pump and a conduit means communicating with the valve means to selectively displace the mixture relative to the chambers, and (e) a staging tank communicating with the conduit means to receive batches of the mixture from the mixing chambers, the staging tank having a main discharge port to dispense the mixture therethrough, the staging tank being elevated with respect to the mixing chambers so that the main discharge port thereof is elevated sufficiently to permit a dispersal container to be located below the discharge port so as to be filled therefrom by gravity.

8. An apparatus as claimed in claim 7, in which:

(a) a supporting frame cooperates with the mixing chambers and has a staging tank support thereon, and (b) the staging tank is adapted to be releasably supported on the staging tank support to facilitate separation of the staging tank from the mixing and dispensing apparatus to enable separate transportation and storage thereof.

9. An apparatus as claimed in claim 8, in which:

(a) the staging tank has a fluid containing tank, a main discharge valve to control flow of mixture through the main discharge port, and a plurality of legs to support the holding tank in a position above the staging tank support to elevate the staging tank sufficiently to permit discharge of mixture from the main discharge port into a dispersal container located below the main discharge port.

10. An apparatus as claimed in claim 8, in which the staging tank comprises:

(a) a liquid holding container having an inlet port communicating with the conduit means, and a main discharge valve to control flow through the main discharge port.

11. An apparatus as claimed in claim 10, in which:

(a) the inlet port of the staging tank is adapted to discharge the mixture into the container generally tangentially so as to induce a vortex therein.

12. A mixing and dispensing apparatus for mixing a shreddable starting material with a liquid, the apparatus comprising:

(a) a mechanical shredder to shred the starting material into a resultant shredded material, (b) first and second mixing chambers adapted to receive the shredded material and the liquid, each chamber having at least one liquid port and a mixer to produce a resultant mixture of the liquid and shredded material, (c) a valve means communicating with the liquid ports to control flow of the mixture relative to the port of each chamber, (d) a main pump and a conduit means communicating with the valve means to selectively displace the mixture relative to the chambers, (e) a staging tank communicating with the conduit means to receive batches of the mixture from the mixing chambers, the staging tank having a main discharge port to dispense the mixture therethrough, and (f) a power pack apparatus comprising a supporting frame, a self-contained prime mover supported by the frame and adapted to power the liquid pump, a container supported by the frame to receive hose accessories and related equipment, and a receptacle supported by the frame to receive the staging tank.

13. An apparatus as claimed in claim 12, in which:

(a) a hydraulic fluid pump, supported by the frame, is coupled to the prime mover to power the hydraulic fluid pump, and a sump supplies hydraulic fluid to the hydraulic fluid pump to generate a supply of pressurized hydraulic fluid, and (b) the main pump is powered by a hydraulic motor supplied with pressurized hydraulic fluid from the hydraulic fluid pump.

* * * * *